J. W. CAMERON.
Packing for Steam or Water Pipes.
No. 226,387.  Patented April 13, 1880.
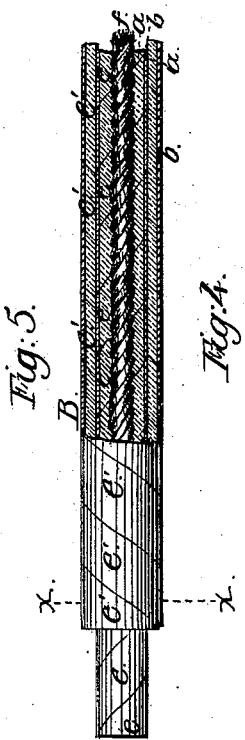
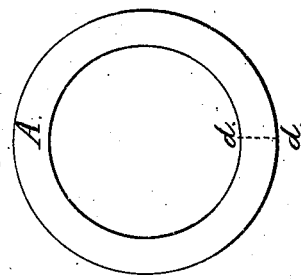
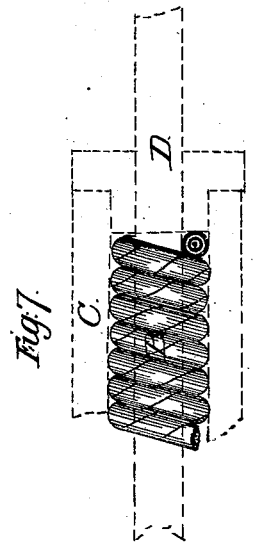
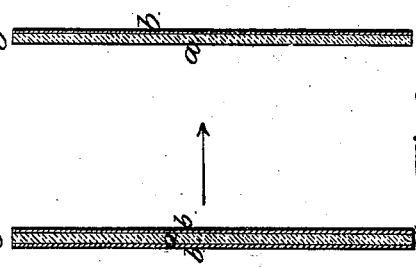
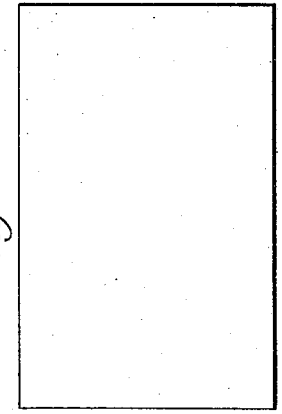
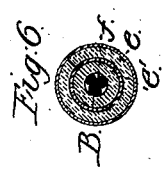
Witnesses:
Willy J. E. Schultz
John C. Tunbridge
Inventor:
James W. Cameron
by his attorney
A. v. Briesen

UNITED STATES PATENT OFFICE.

JAMES W. CAMERON, OF NEW YORK, N. Y., ASSIGNOR TO WILLIAM BELL, OF SAME PLACE.

PACKING FOR STEAM OR WATER PIPES.

SPECIFICATION forming part of Letters Patent No. 226,387, dated April 13, 1880.

Application filed December 20, 1879.

*To all whom it may concern:*

Be it known that I, JAMES W. CAMERON, of the city, county, and State of New York, have invented a new and Improved Packing for Steam and Water Pipes, of which the following is a specification.

My invention relates to an improved packing for steam and water pipes, cylinder-heads, piston-rods, and other similar purposes.

The object of the invention is to provide a packing adapted to make a very tight joint, and which is possessed of great elasticity and durability, and which, at the same time, is sufficiently economical to allow of its being used for all the ordinary purposes of packing.

The invention consists of a packing composed of a thin layer or layers of cork, with a covering on one or both sides, of canvas or other fabric, glued or cemented to the cork.

In the accompanying drawings, Figure 1 is a section of my improved packing which has both sides of the cork covered with canvas. Fig. 2 represents a section of the packing in which but one side of the cork is covered with canvas. Fig. 3 is a face view of a slab of the packing. Fig. 4 represents a ring of the packing, showing the form in which it is used to pack cylinder-heads and other circular or annular joints. Fig. 5 is a sectional side view of my improved packing in the form of a rope for packing piston-rods, &c. Fig. 6 is a cross-section of the rope packing, taken on line *x x* of Fig. 5; and Fig. 7 shows in dotted lines a stuffing-box and piston-rod with my improved rope packing coiled around the rod within the stuffing-box.

My improved packing is composed of a slice or layer of cork, *a*, which is cut out in such a way that the pores of the cork will run through the thickness of the slice in the direction of the arrow in Figs. 1 and 2. In other words, the slices are cut out at right angles to the grain of the cork. On both sides, as in Fig. 1, or on one side, as in Fig. 2, the slice of cork *a* is covered with canvas, *b*, or other suitable fabric, glued or cemented to the cork. This canvas covering strengthens the cork, and prevents it from breaking and from mashing or being crushed when subjected to pressure. The cork itself being brittle, it would be liable to break or crush easily if alone; but the canvas prevents this. Both sides of the slab of packing are coated with shellac.

When the packing is to be employed for an annular joint—such as a cylinder-head, for example—a slab of the packing, such as is shown in Fig. 3, is taken, and from it is cut a ring, A, Fig. 4, of the same size as the cylinder-head. The ring A is then placed between the cylinder-head and the flange of the cylinder, and serves to pack the joint between said head and flange.

The pores of the cork in the ring A run through the thickness of the said ring, owing to the manner of making the packing as above described, while the width of the ring from *d d* coincides with the direction of the joint between the cylinder-head and the cylinder-flange, so that the whole width of the ring A across the grain of the cork, and therefore in the direction of the greatest density of the cork, is utilized to obstruct the escape of steam or water through the joint between the cylinder and its head.

When the packing is to be used for a piston-rod or other similar purpose it is formed into a rope, B, in the following manner: A narrow strip, *e*, is cut from a slab of the cork packing, which has but one side covered with canvas, like that shown in Fig. 2, and this narrow strip *e* is wound spirally, with its cork or uncovered side in, around a core of rope, *f*. Another strip, *e'*, of the packing, like *e*, is then wound spirally and in the opposite direction around and outside of the spiral strip *e*, in the manner clearly shown in Figs. 5 and 6. By winding the two layers in opposite directions around the axis of the packing-rope the spiral joints between the convolutions of the strips *e e'* are broken, and thereby the escape of steam through the joints is prevented. The surface of the packing-rope thus made is coated with plumbago as a lubricant. In fact, wherever the packing herein described is exposed to friction, it is my intention to coat the exposed surface with plumbago, for the purpose of decreasing friction.

In Fig. 7 is shown, in dotted lines, a stuffing-box, C, and a piston-rod, D. The piston-rod is packed by winding the packing-rope B spirally around the rod D within the stuffing-box C. Owing to the break in the joints of the two layers or strips coiled around the rope $f$, the steam is prevented from passing through the packing-rope B, and as the strips $e\ e'$ are cut at right angles to the pores of the cork, the steam cannot escape through the strips themselves.

The packing-rope may, if desired, be made of one layer of strips of packing wrapped around a rope, $f$.

The packing above described possesses many advantageous qualities. The cork swells when it becomes moistened; but owing to the pores of the cork being at right angles to the width of the packing the swelling does not open the pores in such a way as to give escape to the steam, but, on the contrary, the swelling tightens the joint. In addition to this, the cork is very elastic, thus permitting the parts packed to be tightly and securely connected together. The packing is also economical and very durable.

I claim—

1. A packing for steam and water pipes which is composed of a slice or layer of cork, $a$, having its pores at right angles to the length of the slice, and a layer of canvas, $b$, on one or both sides of the cork, the canvas and cork being cemented together, substantially as and for the purpose described.

2. The packing-rope B, composed of a flexible core, $f$, of rope or other suitable material, and of one or more layers of cork packing, $e\ e'$, composed of layers of cork and canvas, and wound spirally around said core $f$, substantially as described.

JAMES W. CAMERON.

Witnesses:
  W. C. DONN,
  TOMPSON B. MOSHER.